Nov. 24, 1925.
T. C. WILLSON
1,562,816
PHOTOGRAPHIC PRINTING APPARATUS
Filed Jan. 7, 1924
4 Sheets-Sheet 3
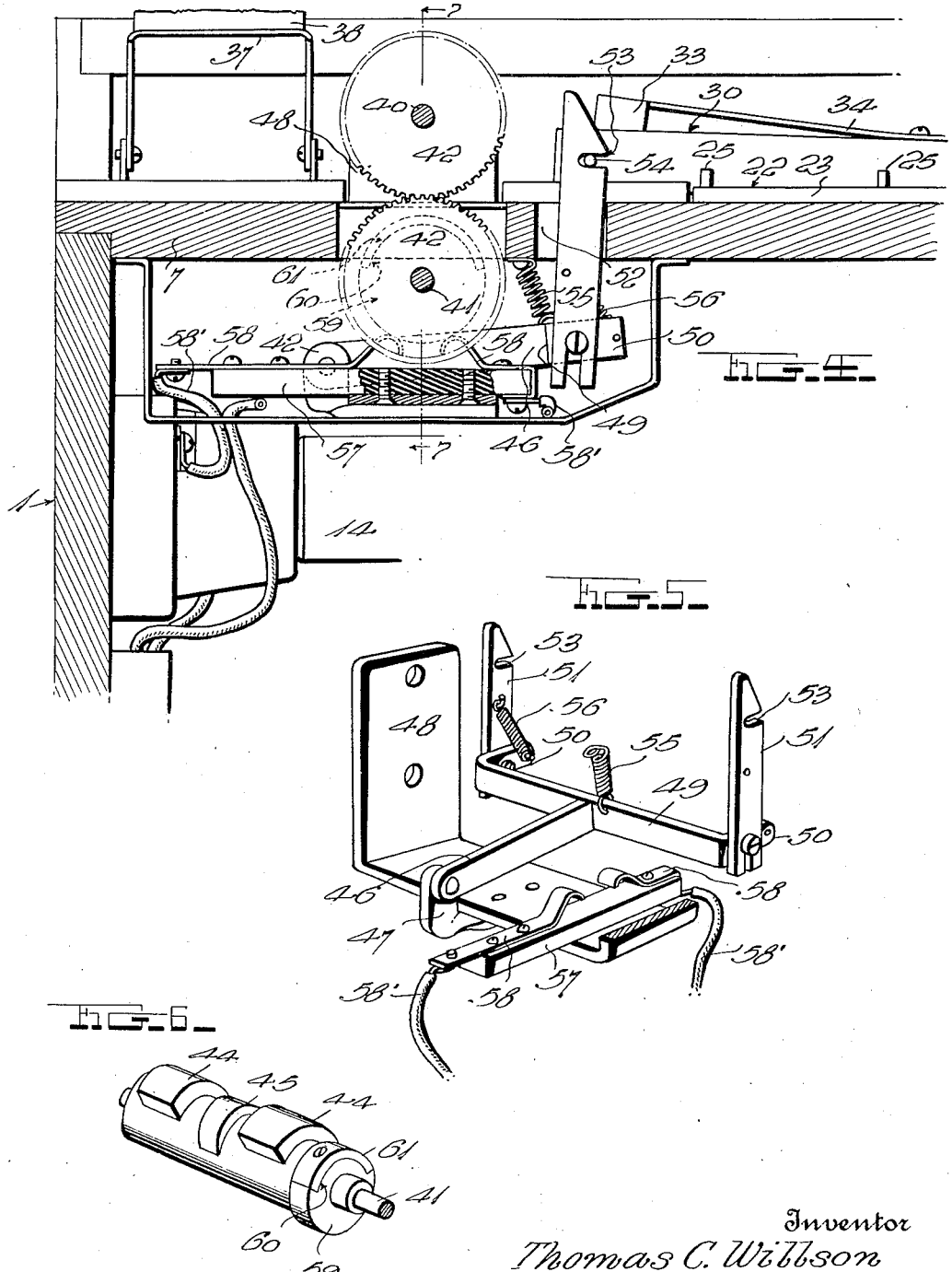
Inventor
Thomas C. Willson
Witness
H. Woodard
By H. B. Willson & Co.
Attorneys

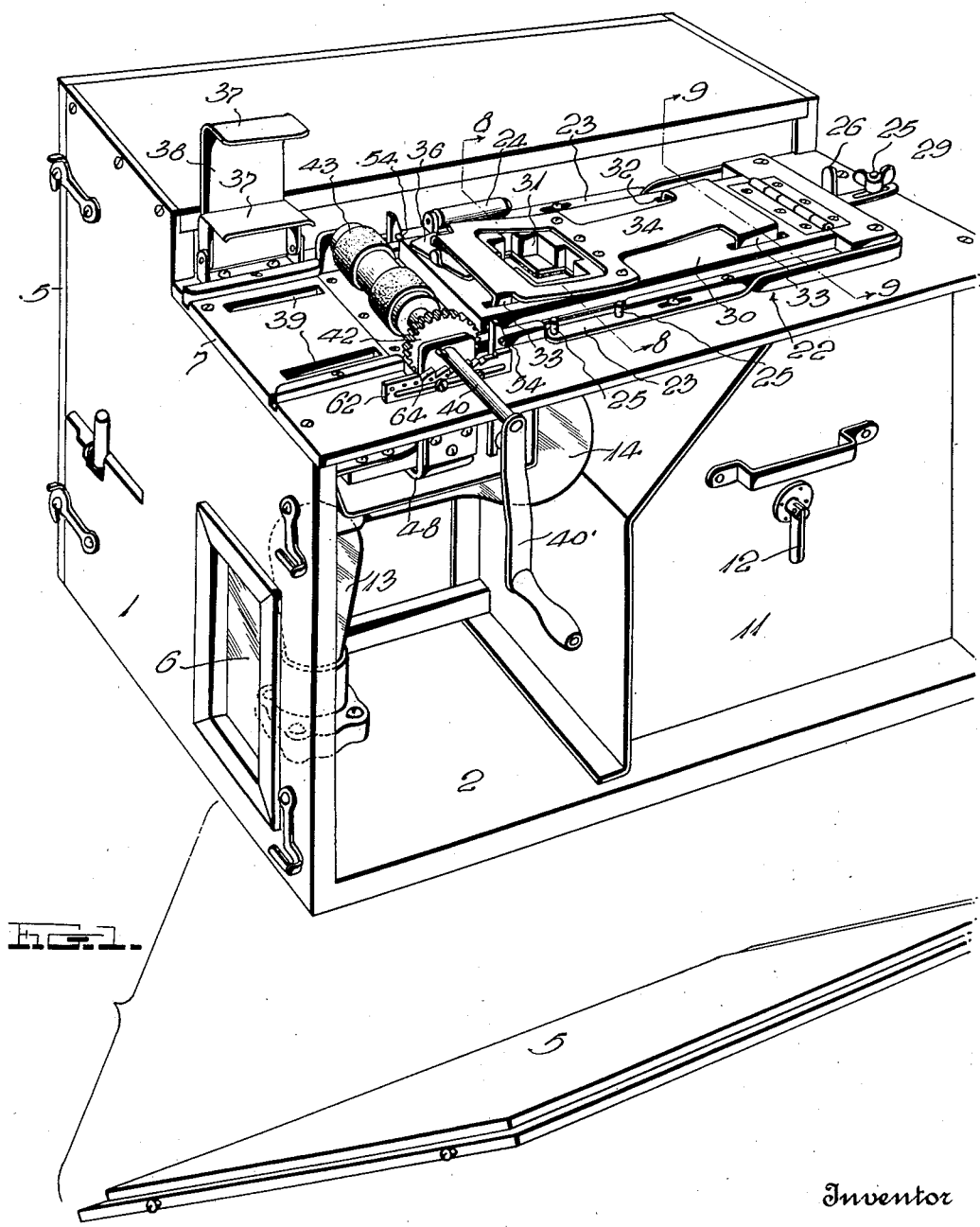

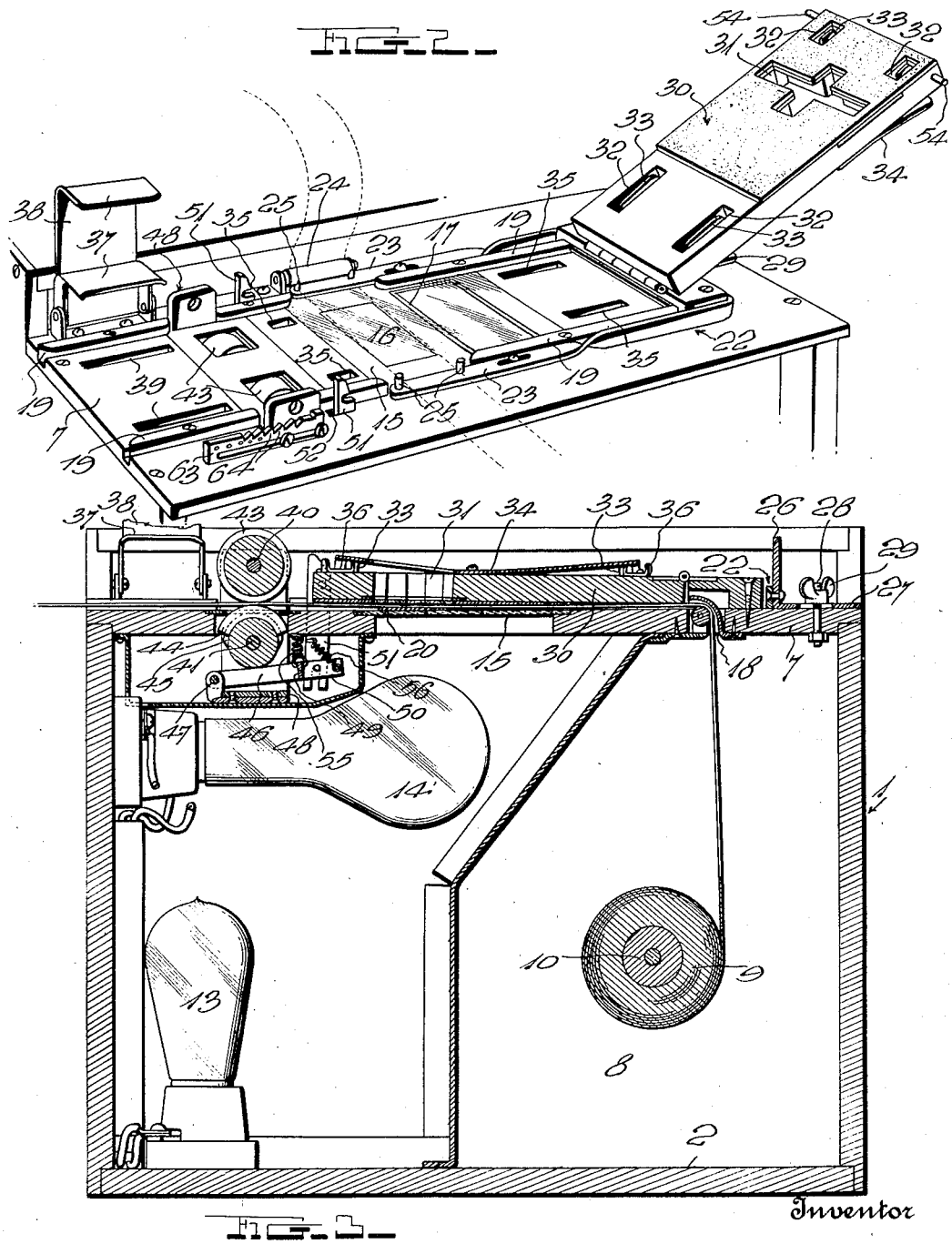

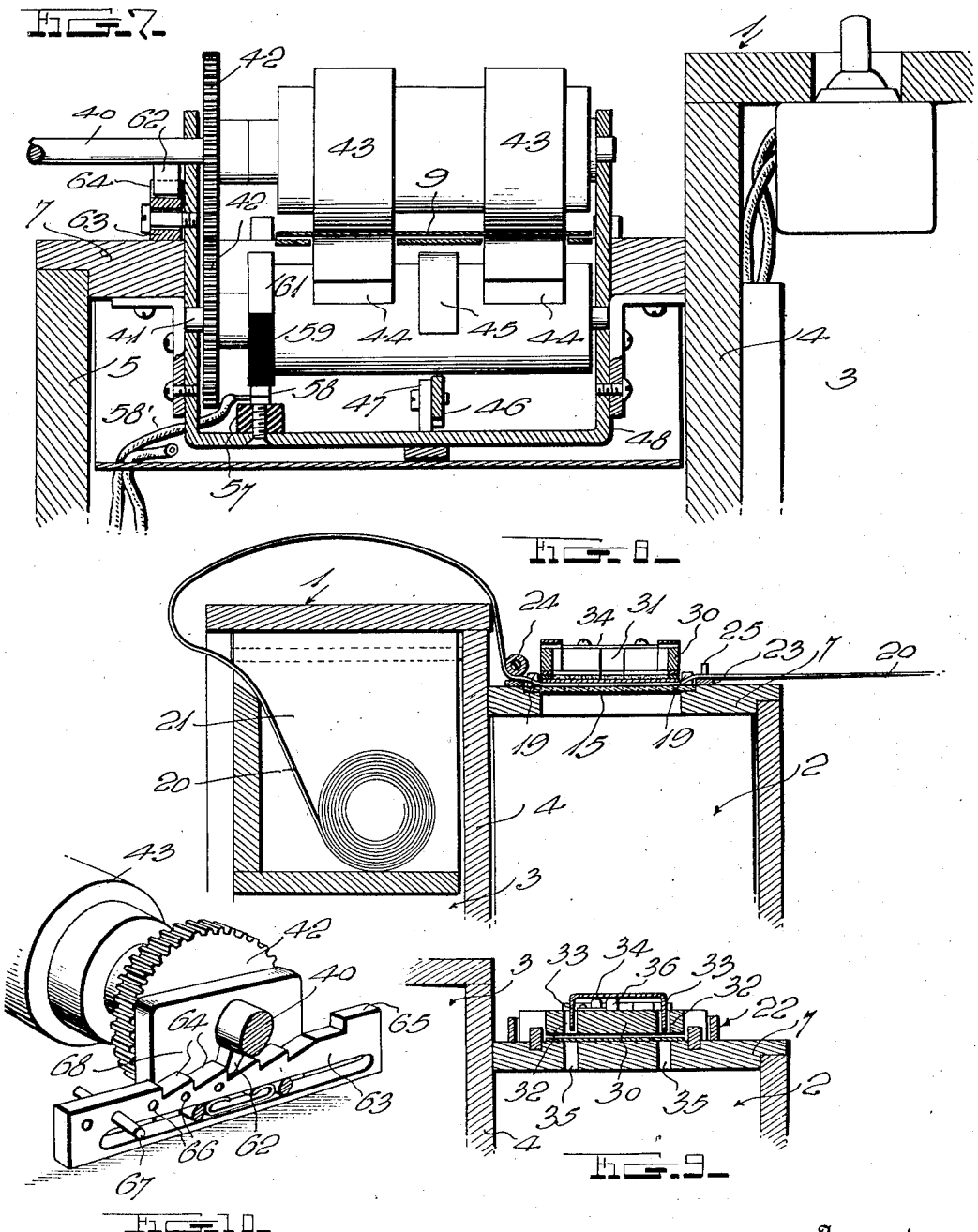

Patented Nov. 24, 1925.

1,562,816

UNITED STATES PATENT OFFICE.

THOMAS CARROLL WILLSON, OF PHILADELPHIA, PENNSYLVANIA.

PHOTOGRAPHIC-PRINTING APPARATUS.

Application filed January 7, 1924. Serial No. 684,818.

*To all whom it may concern:*

Be it known that I, THOMAS CARROLL WILLSON, a citizen of the United States, residing at Philadelphia, in the county of Philadelphia and State of Pennsylvania, have invented certain new and useful Improvements in Photographic-Printing Apparatus; and I do declare the following to be a full, clear, and exact description of the invention, such as will enable others skilled in the art to which it appertains to make and use the same.

This invention for improvements in photographic printing apparatus relates to apparatus in which a plurality of photographic prints are exposed in succession upon a strip of sensitized paper from a negative which may be a strip of film bearing a plurality of pictures.

The apparatus containing the improvements constituting the present invention has been designed for the purpose of making photographic prints on a commercial scale and consequently, the apparatus is arranged so that it can be continuously operated so as to quickly and easily make a large number of prints.

One of the principal features of the apparatus is a means by which the strip of sensitized paper or the like is intermittently advanced across the exposure opening in which a negative is placed. This mechanism not only advances the sensitized strip at the proper time, but it also at the proper time lights and extinguishes a light by which the sensitized strip is exposed.

Another important feature of the apparatus is an adjustable means by which the sensitized strip is guided across the exposure opening, and an adjustable means by which a strip of negative film is guided across the exposure opening. The guiding means for the sensitized strip is made adjustable so as to take care of sensitized strips of different widths. while the guiding means for the negative film is provided to properly arrange the negative across the exposure opening.

Still another important feature of the apparatus is a means to arrest its operation after a predetermined number of exposures have been made. Generally, a photographer is called upon to make about six prints of each picture, so that this means is operated by the apparatus so that after the desired number of prints have been made, the apparatus is locked so that no more can be made until it is again set for operation.

In further disclosing the invention, reference will be had to the accompanying drawings, which illustrate an apparatus containing embodiments of all of the novel features contained in the invention.

In these drawings:—

Fig. 1 is a perspective view of the apparatus, showing one of the cover plates removed;

Fig. 2 is a similar view of the top portion of the apparatus, showing the presser plate, which is hereinafter described, unlocked and in raised position;

Fig. 3 is a longitudinal sectional view of the apparatus;

Fig. 4 is an enlarged vertical longitudinal sectional view of a portion of the apparatus showing the mechanism for raising and lowering the presser plate into and out of engagement with the negative holder and for advancing the sensitized strip across the negative holder and also for operating the light;

Fig. 5 is a perspective view of the unit by which the presser plate is moved into and out of engagement with the negative holder;

Fig. 6 is a perspective view of a shaft constituting a part of the above mentioned mechanism and carrying means for operating the above mentioned unit, means for advancing the sensitized strip at intermittent intervals, and means for closing the circuit through the electric light by which the exposure is made;

Fig. 7 is a transverse sectional view across a portion of the apparatus, taken substantially on the plane indicated by the line 7—7 of Fig. 4;

Fig. 8 is a transverse sectional view taken substantially on the plane indicated by the line 8—8 of Fig. 1;

Fig. 9 is a transverse sectional view of a portion of the apparatus, taken substantially on the plane indicated by the line 9—9 of Fig. 1, and showing the supplemental guide for the sensitized strip in operative position; and Fig. 10 is a perspective view of the parts constituting the means for arresting the movement of the apparatus when a predetermined number of prints have been made.

In the drawings above briefly described, similar reference characters are used to designate corresponding parts throughout the various views, the numeral 1 being used to designate as a whole a box or cabinet in which and upon which the various parts of the apparatus are mounted. The box 1 is divided into a front compartment 2 and a rear compartment 3 by means of an upright longitudinally extending partition 4. Each of these compartments 2 and 3 is provided with a removable cover plate 5. One end of the box 1, opposite the compartment 2, is provided with a sight opening 6 which of course contains a pane of ruby or other appropriately colored glass. The top of the box 1 is preferably of stepped formation as clearly shown in Figs. 1 and 7 of the drawings, and the portion 7 of the top constitutes what may be termed a supporting member, inasmuch as it supports the negative holder and most of the parts of the mechanism for moving the presser plate in and out of engagement with the negative holder, for advancing the sensitized strip across the negative holder and for lighting and extinguishing the light by which the exposures are made.

Arranged in the compartment 2 is a smaller compartment 8. This compartment 8 is provided for the purpose of housing a roll 9 of sensitized paper or the like, and therefore fixed in the compartment is a pin 10 upon which the roll 9 may be rotatably mounted. The compartment 8 is provided with a cover plate 11 which is provided with apertures through which the pin 10 will extend when the cover plate is in place. The free end of the pin 10 carries a pivoted locking arm 12. This arm 12 may be swung into longitudinal alinement with the pin 10 so that the cover plate 11 may be removed or applied, but when the arm 12 is swung at right angles to the pin 10, it will lock the cover plate 11 in place.

In the portion of the compartment 2 which is not occupied by the compartment 8, there is mounted a small electric light bulb 13 and a large or bright electric light bulb 14. The light 13 is really a pilot light and is disposed opposite the sight opening 6, and is intended to be burned constantly while the apparatus is being used. The light 14 is used as the means for exposing the sensitized strip, and as will be hereinafter understood, is automatically lighted and extinguished during the operation of the apparatus.

Arranged in the portion 7 of the top of the cabinet 1, opposite the light 14, is a pane of glass 15. This glass pane 15 is provided with an exposure opening 16 through which the rays of light from the light 14 will pass to and through a negative and onto the strip of sensitized paper. The glass pane 15 is also provided with a transparent or translucent rectangular border 17. The portions of the glass with the exception of the opening 16 and the border 17 are painted or otherwise rendered opaque.

The sensitized strip, that is, the strip of sensitized paper contained on the roll 9 is passed through a slot 18 arranged in the top of the cabinet and is then extended across the portion 7 of the top, across the exposure opening 16. In order to properly guide the strip across the exposure opening, the portion 7 of the top of the cabinet is provided with fixed parallel guide members or rails 19.

The apparatus is primarily designed to be used in making photographic prints from strips of negative film, and when used for this purpose, the strip of film 20 is preferably placed in a small receptacle 21 which is slidably mounted in the compartment 3 of the cabinet 1. The strip 20 of film is then carried over the top of the cabinet and across the exposure opening 16 in a direction at right angles to the direction in which the sensitized strip of paper travels.

The means for guiding the strip of negative film across the exposure opening 16 is preferably adjustably mounted upon the portion 7 of the top of the cabinet so that the film may be properly adjusted over the exposure opening 16. The guiding means for the film, therefore, preferably consists of a U-shaped member 22 which is mounted upon the portion 7 of the top of the cabinet for longitudinal adjustment. The arms 23 of the U-shaped casing member 22 are disposed on opposite sides of and alongside of the fixed guide members or rails 19. The innermost arm 23 carries a roller 24 around which the strip of film passes and both arms carry a pair of pins 25 which serve as guiding elements for the strip of film. It will therefore be seen that as the U-shaped member 22 is adjusted longitudinally of the portion 7 of the top of the cabinet, the film will be adjusted over the exposure opening 16. The portion of the member 22 which connects the two arms 23, carries an upstanding fingerpiece 26 by which it may be moved back and forth, and a slotted lug 27 through which a threaded projection 28 passes from the top of the cabinet. Upon this threaded projection 28 there is a wing-nut 29, which is used to lock the member 22 in adjusted position.

Hinged to the portion 7 of the top of the cabinet adjacent the slot 18, is a presser plate 30. This plate 30 is adapted to be swung downwardly or lowered to cover the glass pane 15, but is provided with an opening 31, which is arranged to overlie the exposure opening 16 when the plate 30 is in lowered position. In addition to the opening 31, the plate 30 is provided at each end with a pair of spaced slots 32, through which guide lugs 33 are adapted to be extended. The guide lugs 33 are bent downwardly from a plate 34 which is secured to the upper side of the plate 30. The plate 34 is preferably secured at its intermediate portion to the plate 30 and the lugs 33 are carried at the ends of the plate 34, so that the ends of the plate 34 may be raised and lowered to retract and project the lugs 33. When the lugs 33 are projected through the slots 32, they engage in grooves 35 which are disposed in the upper surface of the portion 7 of the top of the cabinet, so that the lugs 33 when in engagement with the grooves 35 form additional guides for a narrower strip of sensitized paper than the guides 19 will accommodate.

In order to hold the end portions of the plate 34 raised with the lugs 33 retracted, the ends of the plate 30 are provided with pivoted stops 36. These stops 36 are arranged so as to pass under the ends of the plate 34 and hold the latter in raised position.

The top of the cabinet is provided with additional guides for the sensitized strip. These additional guides are formed as lugs 37 upon a plate 38 which is hinged to the top of the cabinet to be lowered into operative position or raised into inoperative position. When lowered, the lugs 37 fit into grooves 39 arranged in the top of the cabinet.

The mechanism for advancing the sensitized strip across the exposure opening 16 includes a pair of shafts 40 and 41, which are mounted in suitable bearings and disposed respectively above and below the portion 7 of the top of the cabinet. Fixed upon these shafts 40 and 41 are pinions 42, whereby the shafts will be turned in opposite directions when motion is imparted to one of them. The shaft 40 is preferably the drive shaft, and is therefore provided with an operating handle 40'.

The shaft 40 which is mounted above the portion 7 of the top of the cabinet is formed or otherwise provided with a pair of rollers 43 which are adapted to bear and operate upon the sensitized strip. Co-operating with these rollers 43 are segments 44, which are formed or fixed upon the shaft 41, which is disposed underneath the portion 7 of the top of the cabinet. The rollers 43 are arranged to bear upon the upper surface of the sensitized strip, while the segments 44 are arranged to engage at intervals the lower surface of the sensitized strip. In this way, the segments 44 serve to advance the sensitized strip at intervals across the exposure opening 16.

Also formed or fixed upon the shaft 41 is a cam 45, which is arranged to operate a unit for moving the presser plate 30 into and out of engagement with the sensitized strip extended across the exposure opening 16. This unit consists of an arm or lever 46 which is pivoted at one end to a lug 47 provided on a bracket 48 secured to the top of the cabinet. The arm 46 carries a cross head 49, the ends of which are bent laterally to form lugs 50, to which links 51 are pivotally connected. The links 51 extend upwardly through openings 52 which are arranged in the portion 7 of the top of the cabinet. The upper end portions of the links 51 are provided with notches 53 adapted to receive pins 54 which extend or project outwardly from the edges of the presser plate 30. The arm 46 is normally held in raised position by a spring 55 which is secured at one end to the cross head 49 and has its other end secured to the top of the cabinet. Coiled springs 56 yieldably hold the links 51 in engagement with the pins 54. The upper ends of the links 51 are preferably beveled so that when the presser plate 30 is moved downwardly, it will depress the links 51 and the pins 54 will automatically fall into the notches 53.

Mounted upon the bracket 48 is a block 57 of insulating material, upon which is fixed a pair of spaced contacts 58. These contacts are connected by conductors 58' to the socket in which the light 14 is mounted, so that when the contacts are bridged, the circuit through the light will be closed and the light will therefore be lighted.

In order to bridge the contacts 58, there is formed or fixed upon the shaft 41, a disk 59 of insulating material. A portion of the periphery of this disk 59 is cut away as at 60, and fitting upon this cut away portion is a segment 61 of conducting material. The disk 59 is disposed opposite the contacts 58 so that as the disk is rotated when the shaft 41 is turned, the segment 61 will intermittently bridge the contacts 58 and therefore automatically light and extinguish the light 14.

The shaft 40 carries a projection 62 which is adapted to engage and operate a means for arresting the movement of the apparatus after a predetermined number of prints have been exposed. This means, in addition to the projection 62 includes a bar 63 which has a limited sliding movement across the top of the cabinet. One edge of the bar 63 is provided with a series of rack or ratchet teeth 64. These are engageable by the projection 62 so as to advance the bar 63 step by step at each revolution of the shaft 41 as the apparatus is operated. At one end of the bar 63 there is a stop 65. This stop 65 is positioned so as to be engaged by the projection 62, and when so engaged, it will prevent the apparatus from being further operated, at least until the bar 63 is manually moved backwardly and reset.

The bar 63 preferably has a sufficient number of teeth 64 so that the machine may be continuously operated to make six exposures before the projection 62 strikes the stop 65 and the machine becomes locked. In order that the movement of the machine will be arrested after a predetermined number less than six exposures have been made, the bar 63 is provided with a series of apertures 66. These are designed to receive a pin 67, which is engageable with the lug 68 forming a bearing for the shaft 40 to limit the movement of the bar 63 when it is reset. In this way, the bar 63 may be set so that any number of exposures less than six may be made before the machine will be thrown out of operation.

In using the apparatus, the presser plate 30 should first be uncoupled from the links 51 and swung to its raised position. When in this position, the strip of negative film 20 may be passed across the top of the cabinet under the roller 24 and across the exposure opening 16, being guided by the guiding elements 25. Longitudinal adjustment of the member 22 will serve to properly adjust the film with respect to the exposure opening 16.

The sensitized strip should then be passed through the slot 18 and across the portion 7 of the top of the cabinet, over the exposure opening 16 and the film and under the rollers 43.

After the film and sensitized strip have been arranged in the above described manner, the presser plate should be lowered, so that the pins 54 will engage in the notches 53 in the links 51 and the presser plate will be held downwardly by said links.

When the parts are in this position and the bar 63 is set so that the machine may be operated, the crank arm 43 should be turned. When this is turned, the shafts 40 and 41 will be rotated in opposite directions and the presser plate 30 will be moved into and out of engagement with the sensitized strip, by the intermittent engagement of the cam 45 with the pivoted arm 46, upon which the links 51 are really mounted.

During the time that the cam 45 is depressing the arm 46 and the presser plate 30 is held in engagement with the sensitized strip, the segment 61 will be in a position to bridge the contacts 58 and close the circuit through the light 14, so that at this time, the sensitized strip is being exposed by the light 14.

When the cam 45 disengages the arm 46, the spring 54 will raise said arm and consequently the presser plate 30 will be raised out of engagement with the sensitized strip. At the same time, the segments 44 will be brought into engagement with the lower surface of the sensitized strip and the strip will be advanced a predetermined amount across the exposure opening 16 so as to position another portion of the strip over the opening.

While a portion of the sensitized strip is being exposed through the opening 16, another portion will be exposed through the border 17, and then when the strip is advanced to make another exposure, the portion which was exposed through the border 17 will be brought into coincidence with the opening 16, so that the sensitized strip will be exposed through the negative in the center part of the border. In this way, the prints which are made with the apparatus will contain a border around the picture.

As the crank 40' is turned so as to turn the shaft 41, the projection 62 will engage the notches 64 in the bar 63 and advance the bar intermittently. It will be advanced one step at each revolution of the shaft 40, until the projection 62 strikes the stop 64 when operation of the apparatus will be arrested at least until the bar 63 is moved in the opposite direction and reset. If less than six prints are to be made, then the pin 67 is placed in the proper aperture 66.

The apparatus contains no means for automatically advancing the strip of negative film across the exposure opening 16, as such film may be very easily advanced by hand, whenever desired.

If the sensitized strip upon which the exposures are to be made is narrower than the guides or rails 19 will properly accommodate, the plate 38 should be swung down so that the lugs 37 will engage in the grooves 39, and the stops 36 should be swung outwardly from under the ends of the plates 34 so that the lugs 33 will project all the way through the plate 30 and engage in the grooves 35. The lugs 33 and 37 will therefore form guides for the narrower strip of sensitized material.

From the foregoing description, taken in connection with the accompanying drawings, the construction, use and operation of the apparatus will be readily understood. It will be seen that the apparatus is practically automatic, inasmuch as the light by which the exposures are made, is automatically turned on and off and that the sensitized strip is automatically advanced during the time that the light is turned off.

It is obvious that numerous changes may be made to the apparatus without departing from the spirit and principle of the invention, or sacrificing any of the advantages thereof, and therefore, it is to be understood that such changes may be made within the meaning and scope of the appended claims which define what is believed to be the novelty contained in the invention.

I claim:

1. In a photographic printing apparatus, the combination of a negative holder across which a sensitized strip is adapted to be extended, and mechanism to advance said strip across said holder at intervals, said mechanism including a continuously operable rotatable segment to engage one side of said strip during a part of its revolution to pull the same.

2. In a photographic printing apparatus, the combination of a negative holder across which a sensitized strip is adapted to be extended, of mechanism to advance said strip across said holder at intervals, said mechanism including a roller to engage one side of said strip and a continuously operable rotatable segment to engage the other side of said strip during part of its revolution, whereby said strip is pulled intermittently.

3. In a photographic printing apparatus, the combination with a negative holder across which a sensitized strip is adapted to be extended, and a presser plate movable into and out of engagement therewith; of mechanism fixedly mounted relatively to said holder and operable continuously as a unit to pull said plate into engagement with said holder and push it out of engagement with the same and to advance said strip across said holder while said plate is out of engagement therewith, said mechanism including a rockable unit having detachable latch connection with said plate, and means for rocking said unit.

4. In a photographic printing apparatus, the combination with a negative holder across which a sensitized strip is adapted to be extended, and a presser plate movable into and out of engagement therewith; of mechanism fixedly mounted relatively to said holder and operable continuously as a unit to pull said plate into engagement with said holder and push it out of engagement with the same and to advance said strip across said holder while said plate is out of engagement therewith, said mechanism including a rockable unit provided with a link having detachable latch connection with said plate, and means for rocking said unit.

5. In a photographic printing apparatus, the combination with a negative holder across which a sensitized strip is adapted to be extended, and a presser plate movable into and out of engagement therewith; of mechanism fixedly mounted relatively to said holder and operable continuously as a unit to move said plate into and out of engagement with said holder and to advance said strip across said holder while said plate is out of engagement therewith, said mechanism including a pair of rotatably mounted shafts located on opposite sides of said strip, means for turning said shafts in opposite directions, a roller on one shaft to engage one side of said strip, a segment on the other shaft to engage the other side of said strip during part of its revolution, whereby said strip is pulled intermittently, a rockable unit coupled to said plate, and a cam on one shaft to rock said unit.

6. A structure as specified in claim 5, together with latch means by which the rockable unit is detachably coupled to the plate.

7. In a photographic printing device, the combination with a supporting member having an exposure opening, of a guideway to guide a sensitized strip across said opening, a pair of arms slidably mounted upon said supporting member, said arms being disposed along the opposite edges of said guideway and being adjustable longitudinally thereof, guiding elements mounted upon said arms to guide a strip of negative film across said opening in a direction at right angles to the sensitized strip, and means for adjusting said arms simultaneously.

8. In a photographic printing device, the combination with a supporting member having an exposure opening, of a guideway to guide a sensitized strip across said opening, a U-shaped member mounted upon said supporting member to slide longitudinally of said guideway, the arms of said member extending parallel to said guideway and being disposed on opposite sides thereof, and guiding elements mounted upon said arms to guide a strip of negative film across said opening in a direction at right angles to the sensitized strip.

9. In a photographic printing device, the combination with a supporting member having an exposure opening, of parallel guides mounted upon said supporting member to guide a sensitized strip across said opening, and additional guides associated with said supporting member to guide across said opening a narrower sensitized strip than will fit between said parallel guides, said additional guides being movable into and out of operative position.

10. In a photographic printing device, the combination with a supporting member having an exposure opening, of a pair of fixed parallel guides to guide a sensitized strip across said opening, and additional guides associated with said supporting member to guide across said opening, a sensitized strip which is narrower than a strip for which said fixed parallel guides are intended, said additional guides being movable into and out of operative positions and being disposed between said fixed parallel guides in order to guide the narrower sensitized strip across the central portion of said opening.

11. In a photographic printing device, the combination with a supporting member having an exposure opening, of a pair of fixed parallel guides mounted upon said supporting member to guide a sensitized strip across said opening, and additional guides associated with said member to guide across said opening a sensitized strip which is narrower than the strip for which said fixed parallel guides are intended, one of said additional guides being hingedly mounted to said supporting member to swing into an out of operative position.

12. In a photographic printing device, the combination with a supporting member having an exposure opening, and a presser plate movable into and out of engagement with said supporting member; of a pair of fixed parallel guides mounted upon said supporting member to guide a sensitized strip across said opening, and additional guides to guide across said opening the sensitized strip which is narrower than the strip for which said fixed parallel guides are intended, one of said additional guides being mounted upon said presser plate and having guiding lugs extending through slots in the latter into engagement with said supporting member, and means mounted upon said presser plate for holding said lugs out of engagement with said supporting member.

In testimony whereof I have hereunto affixed my signature.

THOMAS CARROLL WILLSON.